United States Patent Office 3,272,071
Patented Sept. 13, 1966

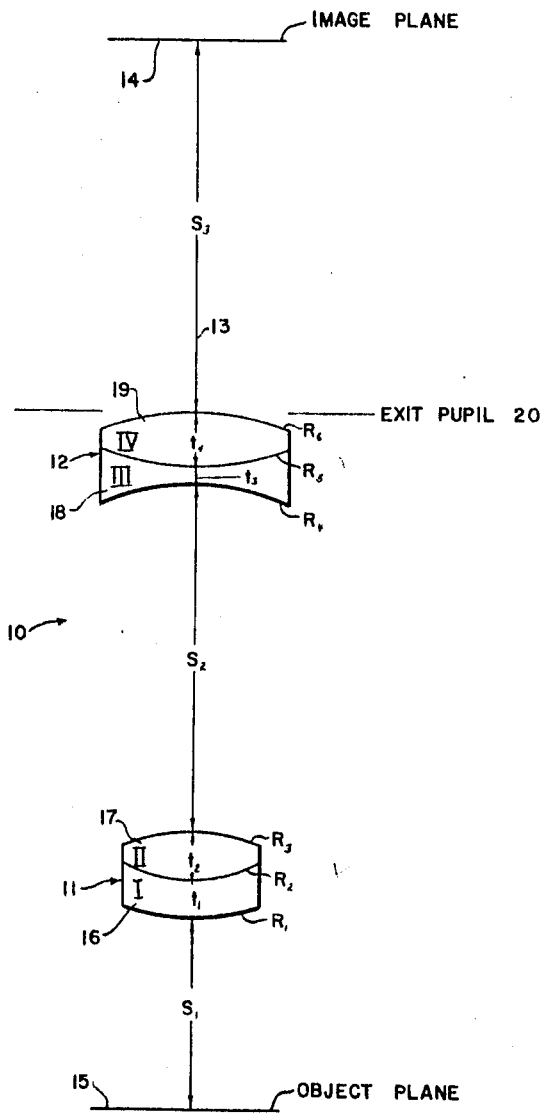

3,272,071
MICROSCOPE OBJECTIVE HAVING TWO DOUBLETS
George F. Ziegler, Gates, N.Y., assignor to Bausch & Lomb Incorporated, Rochester, N.Y., a corporation of New York
Filed June 14, 1963, Ser. No. 288,035
4 Claims. (Cl. 88—57)

This invention relates to an optical objective for microscopes and the like and more particularly relates to objectives of low magnification and numerical aperture.

When the conventional microscope is used with Köhler illumination, the exit pupil of each participating objective lies at the upper focal plane of that objective. Since in low power objectives the distance from the specimen plane to the upper focal plane of the objective tends to be long relative to that of high power objectives, the exit pupil of the objective moves upwardly in the microscope tube as low power objectives are substituted for higher power objectives. In the conventional microscope, this variation of position of the objective exit pupil has practically no optical effect, and would manifest itself at most by an imperceptibly small shift of the eyepiece exit pupil.

However, when auxiliary optical systems such as variable power relay systems are introduced into the microscope between the objective and the eyepiece, the abovementioned variation in position of the objective exit pupil when using various objectives has two disturbing effects: firstly, the image aberration correction of the auxiliary optical system changes with the shift of the objective exit pupil; and secondly, the above-mentioned pupil shift may introduce vignetting of rays in the off-axis pencils of rays.

For the above-recited reasons, it is desirable to develop a series of microscope objectives in which the axial position of the exit pupil is maintained as near constant as possible. Since the higher power objectives are already difficult to design due to their high numerical aperture, it is most convenient to choose a pupil position dictated by the high power objectives and design the low power objectives to conform to this pupil position.

It is an object of this invention to provide a low power objective for microscopes and the like which is of simple form; which is parfocal with other objectives used on the microscope; which has been corrected for spherical aberration, coma, astigmatism, longitudinal and lateral chromatic aberration; and which, in comparison to low power objectives of prior art, has an exit pupil situated at a smaller axial distance from the specimen plane.

Further objects and advantages will be apparent in the details of construction of the invention by reference to the specification herebelow taken together with the drawing wherein the single figure shows an optical diagram of a preferred form of the present invention.

In the drawing, a low power objective of substantially 10× for a microscope is generally designated by the numeral 10, said objective being composed of a front doublet lens 11 and an axially spaced rear doublet lens 12. The objective lenses 11 and 12 are aligned on an optical axis 13 and together form an image 14 of an object surface 15. Lens 11 consists of a front negative meniscus lens element 16 which is preferably cemented to a rear positive double convex lens element 17. The rear lens 12 consists of a front double concave lens element 18 which is preferably cemented to a rear double convex lens element 19.

By experiment and computation, certain constructional data for a successful form of this invention have been discovered as given in the several tables of values or mathematical statements herebelow, the exit pupil 20 being located substantially in the plane of the rear vertex of the lens element IV.

Said values are recited in certain of said tables in the form of a range of values to describe a large number of non-ideal objectives which result from the method used for manufacture of low-cost objectives. In said method, a large number of each of lens elements I to IV are produced wherein the construction data or dimensions are assigned ± limits in accordance with good manufacturing practice and within the limits stated in the tables. The lens elements so produced are selectively assembled by experts who are skilled in the art to provide a large number of non-ideal as well as ideal objectives which all perform as above specified and are commercially acceptable in low-cost microscopes.

With respect to the focal lengths $F_I$ to $F_{IV}$ of the individual lens elements I to IV, the values are as follows, and the minus (—) sign used with certain values means negative focal length.

$$.675F < -F_I < .745F$$
$$.412F < F_{II} < .454F$$
$$1.021F < -F_{III} < 1.127F$$
$$.707F < F_{IV} < .781F$$

wherein F designates the equivalent focal length of the objective.

With respect to the radii $R_1$ to $R_6$ of the lens surfaces, the successive lens thicknesses $t_1$ to $t_4$, and the successive air spaces $S_1$ to $S_3$ between the object and image planes, as well as the refractive indices $n_D$ and Abbe number $\nu$ of the successive lens materials, the range of values therefor are given in the table herebelow, $$2.44F < R_1 < 2.68F$$
$$.356F < R_2 < .392F$$
$$.472F < -R_3 < .522F$$
$$12.28F < -R_4 < 13.56F$$
$$.671F < R_5 < .741F$$
$$.750F < -R_6 < .828F$$
$$.0772F < t_1 < .0852F$$
$$.1543F < t_2 < .1705F$$
$$.0962F < t_3 < .1062F$$
$$.1780F < t_4 < .1980F$$
$$.421F < S_1 < .465F$$
$$.744F < S_2 < .822F$$
$$9.710F < S_3 < 10.730F$$
$$\left.\begin{array}{l}1.619 < n_D(I) = n_D(III) < 1.623\\ 1.521 < n_D(II) = n_D(IV) < 1.525\\ 34.0 < \nu(I) = \nu(III) < 38.0\\ 56.0 < \nu(II) = \nu(IV) < 60.0\end{array}\right\} \text{absolute values}$$

wherein F designates the equivalent focal length of the aforesaid objective 10, and the minus (—) sign used with the R values applies to those surfaces which have their centers of curvature located on the entrant side of the vertex of said surfaces.

More specifically, the values of the constructional data are given in the table herebelow, the designations in all cases having the same meaning.

$R_1 = 2.56F$      $t_2 = .1624F$
$R_2 = .374F$      $t_3 = .1012F$
$-R_3 = .497F$      $t_4 = .1870F$
$-R_4 = 12.92F$      $S_1 = .443F$
$R_5 = .706F$      $S_2 = .783F$
$-R_6 = .789F$      $S_3 = 10.22F$
$t_1 = .0812F$ $$\left.\begin{array}{l} n_D(I) = n_D(III) = 1.621 \\ n_D(II) = n_D(IV) = 1.523 \\ \nu(I) = \nu(III) = 36.2 \\ \nu(II) = \nu(IV) = 58.6 \end{array}\right\} \text{absolute values}$$

The numerical values relating to a complete set of constructional data for a particularly successful form of the present invention is given in the chart below.

[E.F.L. = 19.73    Magnification = 10×    N.A. = 0.25]

| Lens | Radii | Focal Length | Thickness | Spaces | $n_D$ | $\nu$ |
|------|-------|--------------|-----------|--------|-------|-------|
| I    | $R_1 = 49.659$ | $F_I = -14.010$ | $t_1 = 1.6$ | $S_1 = 8.74$ | 1.621 | 36.2 |
| II   | $R_2 = 7.3114$ $-R_3 = 9.8175$ | $F_{II} = 8.567$ | $t_2 = 3.2$ | $S_2 = 15.42$ | 1.523 | 58.6 |
| III  | $-R_4 = 255.86$ | $F_{III} = -21.215$ | $t_3 = 2.0$ | $S_3 = 202.04$ | 1.621 | 36.2 |
| IV   | $R_5 = 13.932$ $-R_6 = 15.560$ | $F_{IV} = 14.691$ | $t_4 = 3.7$ |  | 1.523 | 58.6 | wherein E.F.L. designates the equivalent focal length of the objective, and N.A. designates the numerical aperture, the minus (—) sign used with the $F_I$ to $F_{IV}$ designations meaning negative focal lengths, while the minus sign (—) used with the R values applies to those lens surfaces whose centers of curvature lie on the entrant side of the vertices of said surfaces.

Although only a certain form of the present invention has been shown and described in detail, other forms are possible and changes may be made in the constructional properties of the lens elements within the specified ranges without departing from the spirit of the invention as defined in the claims here appended.

I claim:
1. An objective for microscopes and the like comprising a front doublet lens and a rear doublet lens axially aligned therewith and spaced therefrom so as to form an image of an object surface and additionally form an exit pupil substantially in the plane of the rear vertex of the rearmost lens,
said front doublet lens consisting of a front negative meniscus lens element I which is in contact with a rear doublet convex lens element II,
said rear doublet lens consisting of a double concave lens element III which is in contact with a rear double convex lens element IV,
the values of focal lengths of the successive lens elements I to IV, the values of the successive lens thicknesses $t_1$ to $t_4$, the values of the successive air spaces $S_1$ to $S_3$ between the object and image, as well as the refractive indices $n_D$ and Abbe number $\nu$ having the numerical values stated in the table herebelow,

$.675F < -F_I < .745F$      $9.710F < S_3 < 10.730F$
$.412F < F_{II} < .454F$      $.0772F < t_1 < .0852F$
$1.021F < -F_{III} < 1.127F$      $.1543F < t_2 < .1705F$
$.707F < F_{IV} < .781F$      $.0962F < t_3 < .1062F$
$.421F < S_1 < .465F$      $.1780F < t_4 < .1980F$
$.744F < S_2 < .822F$ $$\left.\begin{array}{l} 1.619 < n_D(I) < 1.623 \\ 1.521 < n_D(II) < 1.525 \\ 1.619 < n_D(III) < 1.623 \\ 1.521 < n_D(IV) < 1.525 \\ 34.0 < \nu(I) < 38.0 \\ 56.0 < \nu(II) < 60.0 \\ 34.0 < \nu(III) < 38.0 \\ 56.0 < \nu(IV) < 60.0 \end{array}\right\} \text{absolute values}$$

2. An objective for microscopes and the like comprising a front doublet lens, a rear doublet lens axially aligned therewith and spaced therefrom so as to form an image of an object surface, and additionally form an exit pupil located substantially coincidentally with the rear vertex of the rearmost lens,
said front doublet lens consisting of a front negative meniscus lens element I which is in contact with a rear double convex lens element II,
said rear doublet lens consisting of a double concave lens element III which is in contact with a rear double convex lens element IV,
the constructional data for said objective having values as given in the table herebelow wherein $R_1$ to $R_6$ designate the radii of the successive lens surfaces, the minus (—) sign used therewith applying to those lens surfaces having the centers of their radii of curvature lying on the entrant side of the vertex of said surfaces, the lens thicknesses being designated $t_1$ to $t_4$, the successive air spaces between the object surface and image being designated $S_1$ to $S_3$, and the refractive index and Abbe number being designated $n_D$ and $\nu$ respectively, $2.44F < R_1 < 2.68F$      $.744F < S_2 < .822F$
$.356F < R_2 < .392F$      $9.71F < S_3 < 10.73F$
$.472F < -R_3 < .522F$      $.0772F < t_1 < .0852F$
$12.28F < -R_4 < 13.56F$      $.1543F < t_2 < .1705F$
$.671F < R_5 < .741F$      $.0962F < t_3 < .1062F$
$.750F < -R_6 < .828F$      $.1780F < t_4 < .1980F$
$.421F < S_1 < .465F$ $$\left.\begin{array}{l} 1.619 < n_D(I) < 1.623 \\ 1.521 < n_D(II) < 1.525 \\ 1.619 < n_D(III) < 1.623 \\ 1.521 < n_D(IV) < 1.525 \\ 34.0 < \nu(I) < 38.0 \\ 56.0 < \nu(II) < 60.0 \\ 34.0 < \nu(III) < 38.0 \\ 56.0 < \nu(IV) < 60.0 \end{array}\right\} \text{absolute values}$$

wherein F designates the equivalent focal length of the objective.

3. An objective for a microscope as set forth in claim 2 characterized by limitations in said values according to the table of mathematical statements given herebelow, $R_1 = 2.56F$      $S_2 = .783F$
$R_2 = .374F$      $S_3 = 10.22F$
$-R_3 = .497F$      $n_D(I) = 1.621$
$-R_4 = 12.92F$      $n_D(II) = 1.523$
$R_5 = .706F$      $n_D(III) = 1.621$
$-R_6 = .789F$      $n_D(IV) = 1.523$
$t_1 = .0812F$      $\nu(I) = 36.2$
$t_2 = .1624F$      $\nu(II) = 58.6$
$t_3 = .1012F$      $\nu(III) = 36.2$
$t_4 = .1870F$      $\nu(IV) = 58.6$
$S_1 = .443F$ 4. An objective for a microscope as set forth in claim 2 characterized by specific numerical limitations for said values as given in the chart herebelow,

[E.F.L.=19.73   Magnification=10×   N.A.=0.25]

| Lens | Radii | Focal Length | Thickness | Spaces | $n_D$ | $\nu$ |
|---|---|---|---|---|---|---|
| I | $R_1=49.659$ | $F_I=-14.010$ | $t_1=1.6$ | $S_1=8.74$ | 1.621 | 36.2 |
| II | $R_2=7.3114$ $-R_3=9.8175$ | $F_{II}=8.567$ | $t_2=3.2$ | $S_2=15.42$ | 1.523 | 58.6 |
| III | $-R_4=255.86$ | $F_{III}=-21.215$ | $t_3=2.0$ | $S_3=202.04$ | 1.621 | 36.2 |
| IV | $R_5=13.932$ $-R_6=15.560$ | $F_{IV}=14.691$ | $t_4=3.7$ |  | 1.523 | 58.6 | wherein E.F.L. designates the equivalent focal length of the objective, and N.A. designates the numerical aperture, the minus (−) sign used with the $F_I$ and $F_{IV}$ designations meaning negative focal lengths, while the minus (−) sign used with the R values applies to those lens surfaces whose centers of curvature lie on the entrant side of the vertices of said surfaces.

No references cited.

JEWELL H. PEDERSEN, *Primary Examiner.*
JOHN K. CORBIN, *Examiner.*